United States Patent
Deurloo et al.

(10) Patent No.: US 7,358,680 B2
(45) Date of Patent: Apr. 15, 2008

(54) BISTATE HID OPERATION

(75) Inventors: Oscar Deurloo, Rosmalen (NL); Ronald Van Der Voort, Helmond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 228 days.

(21) Appl. No.: 10/539,967

(22) PCT Filed: Dec. 12, 2003

(86) PCT No.: PCT/IB03/06058

§ 371 (c)(1),
(2), (4) Date: Jun. 19, 2005

(87) PCT Pub. No.: WO2004/057934

PCT Pub. Date: Jul. 8, 2004

(65) Prior Publication Data

US 2006/0181222 A1    Aug. 17, 2006

Related U.S. Application Data

(60) Provisional application No. 60/435,240, filed on Dec. 20, 2002.

(51) Int. Cl.
*H05B 37/02* (2006.01)
*H05B 41/16* (2006.01)

(52) U.S. Cl. .................... 315/224; 315/246; 315/291; 315/307

(58) Field of Classification Search ........... 315/209 R, 315/224, 225, 226, 291, 307, DIG. 4, 246, 315/247
See application file for complete search history.

(56) References Cited

U.S. PATENT DOCUMENTS

| 4,931,701 | A  | * | 6/1990  | Carl    | 315/240 |
| 4,994,718 | A  | * | 2/1991  | Gordin  | 315/240 |
| 5,327,048 | A  | * | 7/1994  | Troy    | 315/240 |
| 5,717,295 | A  | * | 2/1998  | Nerone  | 315/307 |
| 6,204,614 | B1 | * | 3/2001  | Erhardt | 315/307 |
| 6,583,588 | B2 | * | 6/2003  | Erhardt | 315/360 |
| 7,119,494 | B2 | * | 10/2006 | Hui et al. | 315/219 |

FOREIGN PATENT DOCUMENTS

| WO | WO02/34015 A1  | 4/2002  |
| WO | WO02/098186 A1 | 12/2002 |

* cited by examiner

*Primary Examiner*—Thuy Vinh Tran

(57) ABSTRACT

Bi-state power operation of an HID lamp system. A power mode control selection determined where a high power mode and a low power mode are selectable. A modulation is determined to generate a driving signal based on the determined power mode control selection. A driving signal is generated based on the determined modulation. The generated driving signal is then applied to the HID lamp. A method of operating an HID lamp is also provided. Power is coupled to an HID lamp with a selectable power signal where the power signal is selectable for full power or reduced power operation.

19 Claims, 3 Drawing Sheets

BISTATE HID OPERATION

CROSS REFERENCE TO RELATED APPLICATION

This application, which is filed under 35 U.S.C. 371 claiming the benefit of PCT/DB03/06058 on Dec. 12, 2003, claims the benefit of U.S. provisional application Ser. No. 60/435,240 filed Dec. 20, 2002, which is incorporated herein by reference.

The invention relates to lighting systems employing high-intensity discharge lamps. More particularly, the invention relates to improved methods for operating high-intensity discharge lamps at multiple output intensities.

High-intensity discharge lamps (HID) are increasingly finding use for multi-purpose lighting applications for both large and small indoor and outdoor facilities. Generally, HID lamps include high-pressure sodium (HPS), metal halide (MH) and ceramic MH lamps. Electronic ballasts for the operation of HID lamps often utilize a low-frequency (~100 Hz) square wave lamp current. It is known that drive currents containing high-frequency (HF) components may cause acoustic resonances in HID lamps. Therefore, the high-frequency (10 kHz-1 MHz) ripple level in HID ballast units is kept very low to avoid HF power components that may induce acoustic resonances in the lamp. It is also known that the sensitivity to acoustic resonances is related to the operating pressure of the lamp and the power density. Generally, HID lamps are more sensitive to acoustic resonances at higher operating pressures.

The electrode behavior of an HID lamp is strongly related to the drive current level and the operating frequency of the HID lamp. It is generally known that when the HID drive current level is reduced, such as in a dimmed situation that the lamp electrodes do not perform adequately. Dimming an HID lamp using a low frequency square wave may result in flicker, blackening of the arc tube or even extinguishing of the lamp altogether. Therefore, HID lamps are limited in output intensity range based upon the rated power output and the electrode design of the lamp.

Therefore, it would be desirable to provide a method of operating HID lamps that overcomes these and other limitations.

In accordance with the present invention, a method for providing bi-state power operation of an HID lamp system is provided. The method provides for determining a power mode control selection, where a high power mode and a low power mode are selectable. The method further provides for determining a modulation to generate a driving signal based on the determined power mode control selection, generating a driving signal based on the determined modulation, and applying the generated driving signal to the HID lamp.

The present invention further provides a system to provide bi-state power operation of an HID lamp system. The system includes means for determining a power mode control selection and, means for determining a modulation to generate a driving signal based on the determined power mode control selection.

In accordance with another aspect of the invention a computer readable medium having instructions for bi-state power operation of an HID lamp system is provided. Instructions for determining a power mode control selection, and instructions for determining a modulation to generate a driving signal based on the determined power mode are provided.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

In the following description the term "coupled" means either a direct connection between the things that are connected, or a connection through one or more active or passive devices that may or may not be shown, as clarity dictates.

Figure 1:
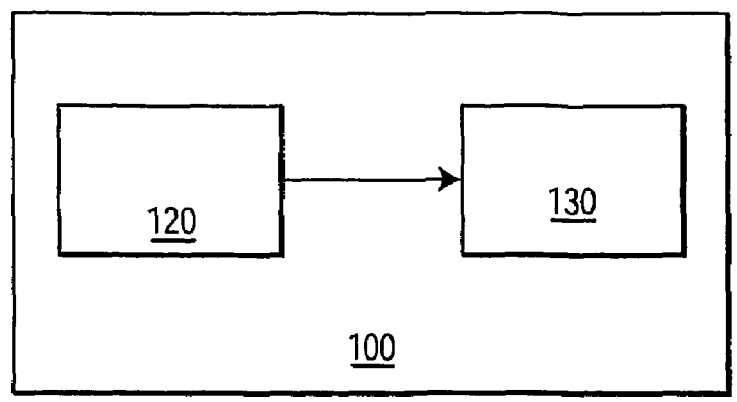
FIG. 1 is a block diagram of a bi-state HID system.

FIG. 1 is a block diagram of a bi-state HID system. FIG. 1 illustrates a bi-state HID system 100 comprising a bi-state HID ballast 120 (hereinafter, ballast), and an HID lamp 130. The bi-state HID ballast is shown coupled to the HID lamp 130. An embodiment of the ballast 120 will be described in further detail in reference to FIGS. 2 and 3.

The bi-state HID ballast 120 is generally comprised of several components that work together to provide power mode control, and to supply a power signal to the HID lamp 130 at two selected power levels. The ballast 120 is arranged to determine a power mode control selection, determine a modulation to generate a driving signal based on the determined power mode control selection, generate a driving signal based on the determined modulation, and apply the generated driving signal to the HID lamp 130. The driving signal is typically representative of one of two configurable operational power levels for the HID lamp 130. In one embodiment, a low power mode of the bi-state HID system 100 includes driving the HID lamp 130 with a low-power high-frequency square wave for dimmed HED operation.

The HID lamp 130 is a high-intensity discharge lamp such as, for example, a metal halide (MH), a ceramic MH, and a high pressure sodium (HPS) type. The HID lamp may have any full-power wattage rating. In one embodiment, the HID lamp is a 400 W ceramic MH capable of operation at full power (400 W) or at a reduced power level of approximately 100 W using the bi-state HID system 100 and method of the present invention.

Figure 2:
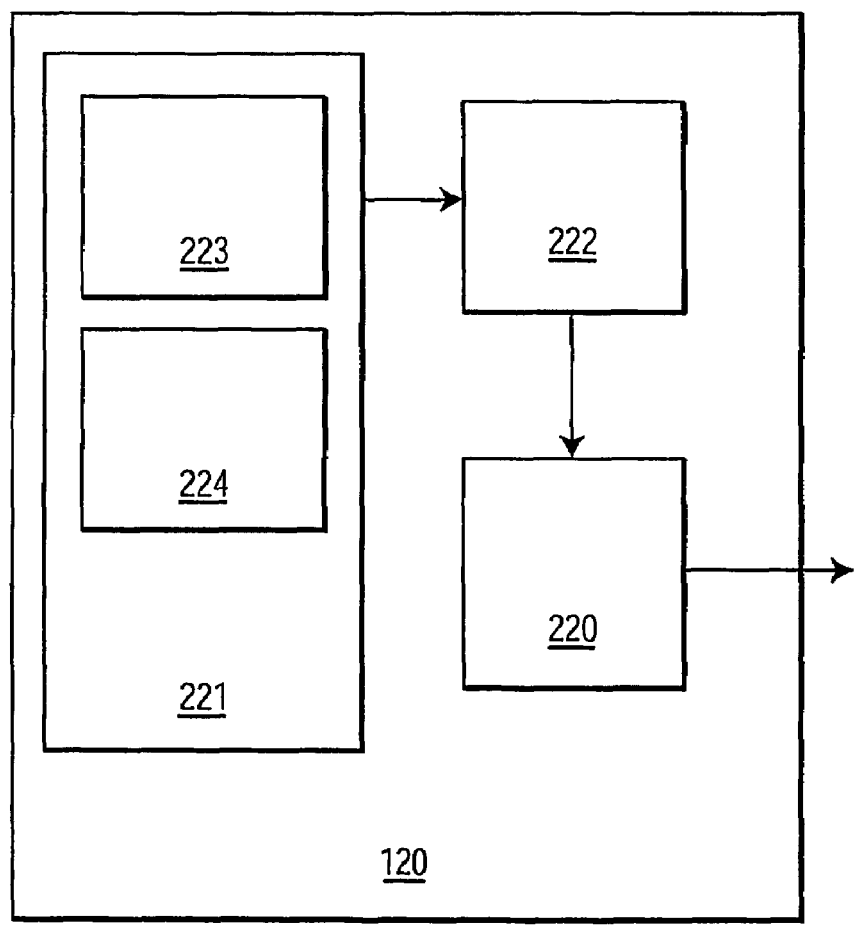
FIG. 2 is a block diagram of a bi-state HID ballast.

FIG. 2 is a block diagram of a bi-state HID ballast as in the ballast 120 of FIG. 1.

FIG. 2 illustrates a bi-state HID ballast 120 comprising a mode control system 221, a power supply 222, and an HID driver circuit 220. The mode control system 221 is shown comprising a high-frequency/low-frequency (HF/LF) select control 223, and a transition point select control 224. In FIG. 2 the mode control system 221 is shown coupled to the power supply 222. The power supply 222 is shown coupled to the HID driver circuit 220. An oscillator circuit is contained in at least one of the various components of the bi-state HID ballast 120 that may be employed to generate high frequency square waves. In one embodiment, bi-state HID ballast 120 is enabled to produce square wave power signals on the order of 40 Hz to over 1 MHz. Many additional components known in the art, may be included in the bi-state HID ballast 120 but are omitted for clarity.

In operation, the mode control system 221 determines a power mode control selection and determines a modulation to generate a driving signal based on the power mode control selection. The HF/LF select control 223 enables selection between high-frequency and low-frequency operation of the ballast 120. The transition point select control 224 enables selection of a transition point between high and low power modes of operation. It is desirable to allow adjustment of the power mode transition point so that the power levels are optimized for the particular HID lamp 130.

In one embodiment, the transition point control 224 allows for a continuously variable setting of the transition between the low-end and the high-end of the HID lamp 130 illumination range. The mode control system 221 may include, for example, a discrete circuit with user inputs, a microcontroller, and a software module. In one embodiment, the mode control system 221 includes a microcontroller having an instruction set able to configure the mode control system 221 for bi-state low-power/high-power operation with a variety of HID lamps of different construction and output ratings. In another embodiment, a user interface may be included for making adjustments to mode control system 221. In yet another embodiment, the mode control system 221 may be preconfigured at manufacture.

The power supply 222 couples power from a raw power source to the HID driver circuit 220. The power supply 222 may be a regulated or unregulated power source. In one embodiment, the power supply 222 is a switch-mode type allowing reduced size, weight, cost, and heat production. In another embodiment, the power supply 222 is controlled by the mode control system 221. In this embodiment, the mode control 221 sends a signal containing modulation signal instruction information that the power supply 222 uses to produce a modulated output signal to drive the HID driver circuit 220.

The HID driver circuit 220 couples power from the power supply 222 to the HID lamp 130. The HID driver circuit 220 may be any circuit arrangement that is enabled to provide both high and low frequency square wave signals to drive the HID lamp 130. In the embodiment illustrated in FIG. 3, the HID lamp driver 220 is a half-bridge-commutating-forward (HBCF) circuit configuration. Those skilled in the art will recognize that many other circuit configurations may be employed for driver circuit 220, such as, for example, the FBCF and down-converter topologies.

Figure 3:
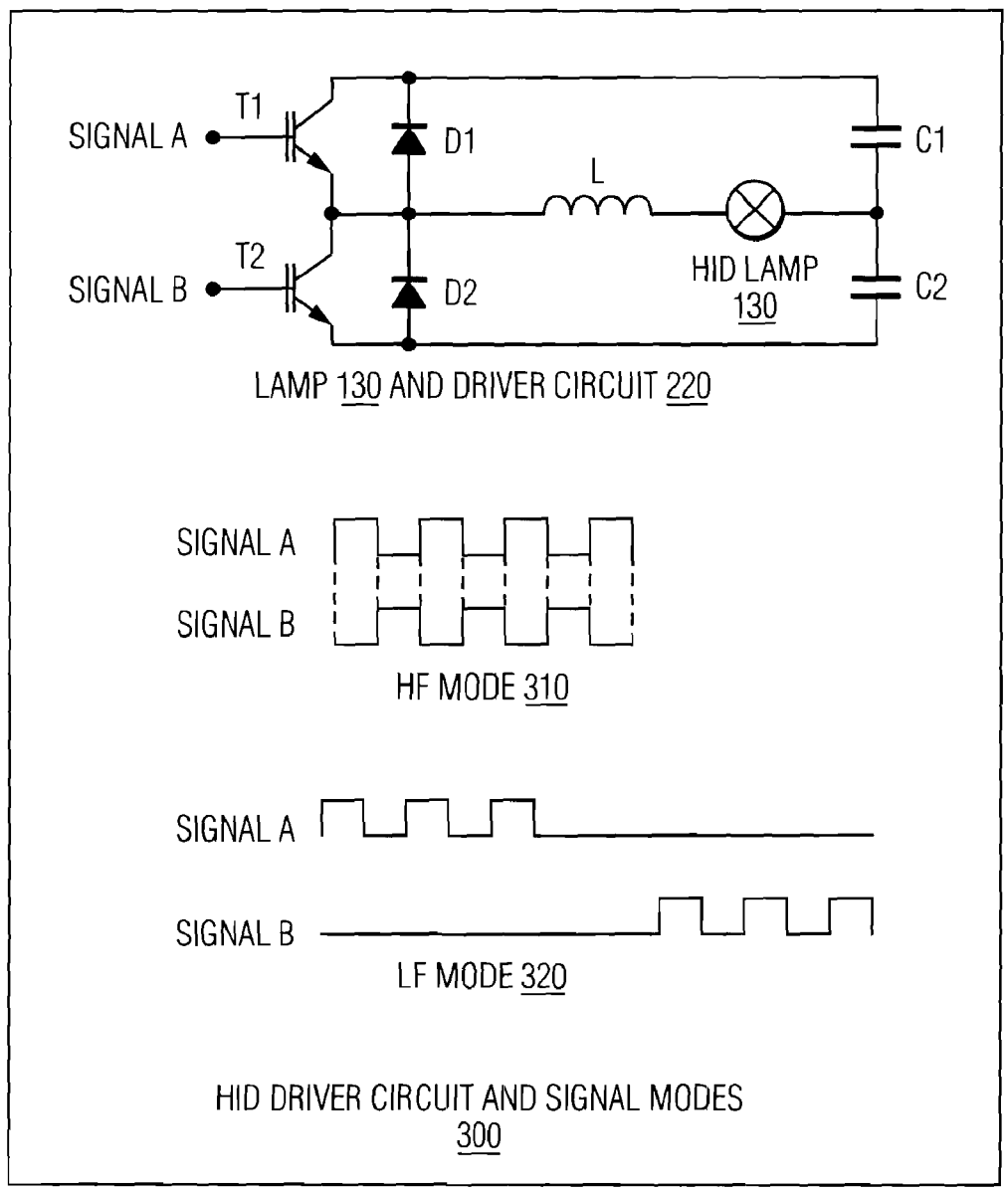
FIG. 3 illustrates an embodiment of an HID driver circuit as in FIG. 2 and signal modes in accordance with the present invention.

FIG. 3 illustrates an HID driver circuit and the corresponding signal modes 300. Lamp driver circuit 220 includes transistors T1, and T2, diodes D1, and D2, inductor L, and capacitors C1, and C2. The HID lamp 130 is shown coupled to the driver circuit 220. Note that in the embodiment of FIG. 3 the capacitors C1 and C2 generally will have a very large capacitance.

In operation, driver circuit 220 of FIG. 3 has signals A and B applied to the bases of transistors T1 and T2 respectively. Generally, signals A and B are periodic signals, comprising pulse trains and square waves depending on the power mode configuration of the ballast 120. Driver circuit 220 may be operated in two distinctly different modes, low-frequency high-power mode and high-frequency low-power mode, depending upon input signals A and B.

In HF mode 310, signals A and B are square waves of identical frequency having 180 degrees of phase lag. Generally, in HF mode 310, signals A and B have frequencies on the order of 20-110 kHz, although for some applications it is beneficial to approach frequencies of 1 MHz or greater. Simultaneous application of signals A and B to driver circuit 220 produces an output signal across the HID lamp 130 of substantially similar frequency to the HID lamp. Under high power conditions, an BF drive signal would normally engender acoustic resonances in the HD lamp 130. However, reducing the drive signal power level of the HF drive signal allows operation of the HID 130 at very reduced output power without lamp resonances, lamp flicker, tube blackening and other anomalous side effects of low-power LF square-wave operation.

In LF mode 320, signals A and B comprise periodic pulse trains of high power HF square waves. Short pulse trains appear at regular intervals depending on the desired drive frequency, and decline to zero during intervals between the pulse trains. The pulse trains of signal A and signal B alternate. The pulse trains generally consist of several cycles of a high-frequency square wave followed by a period of zero output equal to several times the period of the high-frequency square wave. Application of the signals to the driver circuit 220 produces a LF output signal across the HID lamp 130. Generally, in LF mode 320, the resultant driving signal frequencies are on the order of 40-1000 Hz. The driver circuit 220 therefore is capable of bi-state power drive for the HID lamp providing both LF high-power operation, and HF low-power operation without acoustic resonances or flicker and lamp burn.

In the following process description certain steps may be combined, performed simultaneously, or in a different order without departing from the invention.

Figure 4:
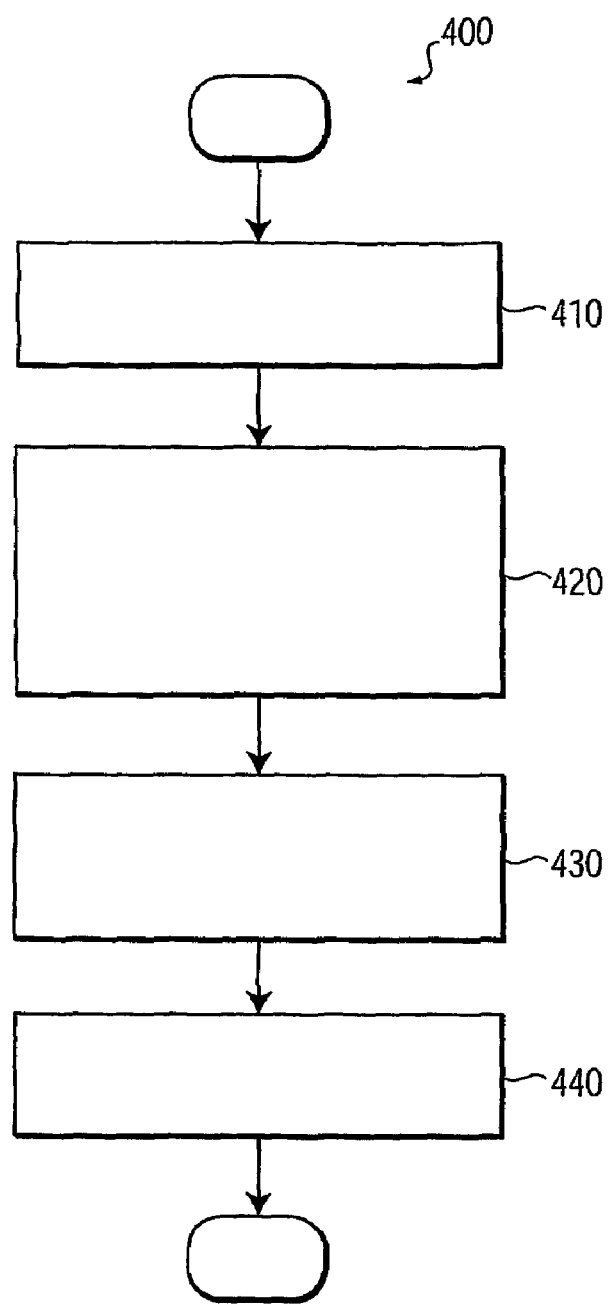
FIG. 4 is a flow diagram of a process for providing bi-state power operation of an HID lamp system in accordance with the present invention.

FIG. 4 is a flow diagram of a process for providing bi-state power operation of an HID lamp system. Generally, a bi-state HID system 100 includes a ballast 120 and an HID lamp 130. Process 400 begins in step 410. In step 410, a power mode control selection is determined. A power mode control selection may be an automated process or a user selection. A power mode determination may be made at any time, such as, for example, while the HID lamp 130 is operating. In one embodiment, a user selects high-power or low power HID lamp 130 operation. In another embodiment, a transition point from high-power mode to low-power operation is selected. In yet another embodiment, a microcontroller determines a selection of power mode and/or transition point. In a further embodiment, the transition point is configurable within a range of HID lamp 130 operational power output levels.

In step 420, a modulation is determined to generate a driving signal based on the determined power mode control selection determined in step 410. The modulation determination is made at any time after the power mode control selection is determined. The modulation determination may be an analog or digital process, or a combination of the two. Generally, the modulation determination involves determining a periodic signal frequency and signal power level necessary to produce either a HF low-power drive signal or a LF high-power drive signal. A mode control system 221 may be employed to determine a modulation.

In step 430, a driving signal is generated based on the determined modulation. The driving signal may be generated at any time after the modulation is determined in step 420. Generating a driving signal typically involves coupling a modulated power signal to a driver circuit 220.

In step 440, the driving signal generated in step 430 is applied to an HID lamp 130. The driving signal is applied at any time after generation, and generally occurs as a continuous process with the driving signal generation.

While the preferred embodiments of the invention have been shown and described, numerous variations and alternative embodiments will occur to those skilled in the art. Accordingly, it is intended that the invention be limited only in terms of the appended claims.

The invention claimed is:

1. A method for providing bi-state power operation of a HID lamp system comprising the acts of:

determining a power mode control selection;
producing a first modulation signal and a second modulation signal for enabling a driver circuit to generate a driving signal based on the determined power mode control selection;
generating the driving signal; and
applying the generated driving signal to the HID lamp;
wherein the first modulation signal and the second modulation signal comprise square wave signals alternated with a zero signal, and wherein the first and second modulation signals are applied to the driver circuit to generate a low frequency drive signal.

2. The method of claim 1 wherein the power mode control is selectable between a high power mode and a reduced power mode.

3. The method of claim 1 wherein the generated low-frequency square wave is responsive to determining a high power mode control selection.

4. The method of claim 1 wherein the generated driving signal is a high-frequency square wave responsive to determining a low power mode control selection.

5. The method of claim 1 wherein determining a power mode selection includes determining a power mode transition point for switching between a high power mode and a low power mode.

6. The method of claim 5 wherein the power mode transition point is selectable.

7. The method of claim 5 wherein the power mode transition point is variable.

8. The method of claim 1 wherein the driver circuit is half-bridge-commutating-forward circuit.

9. A method for providing bi-state power operation of a HID lamp system comprising the acts of:
determining a power mode control selection;
producing a first modulation signal and a second modulation signal for enabling a driver circuit to generate a driving signal based on the determined power mode control selection;
generating the driving signal;
applying the generated driving signal to the HID lamp;
wherein the first modulation signal and the second modulation signal comprise square wave signals having the same frequency but opposite phase and wherein the first and second modulation signals are simultaneously applied to the driver circuit to generate a high-frequency drive signal.

10. A computer readable medium having computer executable instructions for providing bi-state power operation of a HID lamp system comprising:
computer readable code for determining a power mode control selection; and
computer readable code for producing a first modulation signal and a second modulation signal for enabling a driver circuit to generate a driving signal based on the determined power mode control selection;
wherein the first modulation signal and the second modulation signal comprise at least one of square wave signals alternated with zero signal for generating a low frequency drive signal, and square wave signals having the same frequency but opposite phase for generating a high frequency drive signal.

11. The computer readable medium of claim 10 wherein the power mode control is selectable between a full output power HID lamp operation and a reduced output power HID lamp operation.

12. The computer readable medium of claim 10 wherein determining a power mode selection includes determining a power mode transition point for switching between a high power mode and a low power mode.

13. The computer readable medium of claim 12 wherein the power mode transition point is variable.

14. The computer readable medium of claim 10 wherein the low frequency drive signal is generated when the HID lamp is selectably operated at full power and wherein the high frequency drive signal is generated when the HID lamp is selectably operated at reduced power.

15. The computer readable medium of claim 10 wherein at least one of the low frequency drive signal and the high frequency drive signal comprises a square wave.

16. A system to provide bi-state power operation of an HID lamp system comprising:
means for determining a power mode control selection wherein a high power mode and a low power mode are selectable; and
means for determining a modulation producing a first modulation signal and a second modulation signal for enabling a driver circuit to generate a driving signal based on the determined power mode control selection;
wherein the first modulation signal and the second modulation signal comprise at least one of square wave signals alternated with zero signal for generating a low frequency drive signal, and square wave signals having the same frequency but opposite phase for generating a high frequency drive signal.

17. The system of claim 16, wherein the driver circuit is a half-bridge-commutating-forward circuit.

18. A system to provide bi-state power operation of an HID lamp system comprising:
a power mode selector for selecting a high power mode and a low power mode; and
a driver circuit configured to produce a first modulation signal and a second modulation signal for generating a driving signal based on the selected power mode;
wherein the first modulation signal and the second modulation signal comprise at least one of square wave signals alternated with zero signal for generating a low frequency drive signal, and square wave signals having the same frequency but opposite phase for generating a high frequency drive signal.

19. The system of claim 18, wherein the low frequency drive signal is generated in the high power mode and the high frequency drive signal is generated in the low power mode.

* * * * *